June 12, 1951 F. A. DAHMS 2,556,469
APPARATUS FOR DELIVERING NEWLY MOLDED GLASSWARE
Filed March 19, 1948 3 Sheets-Sheet 1
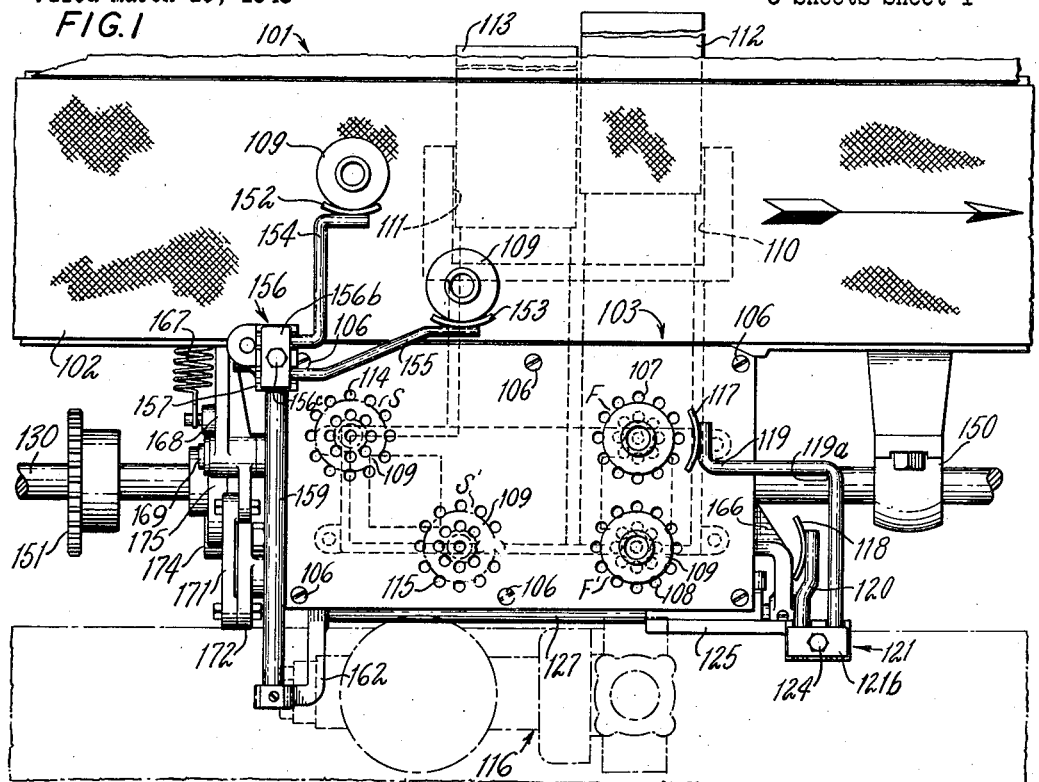
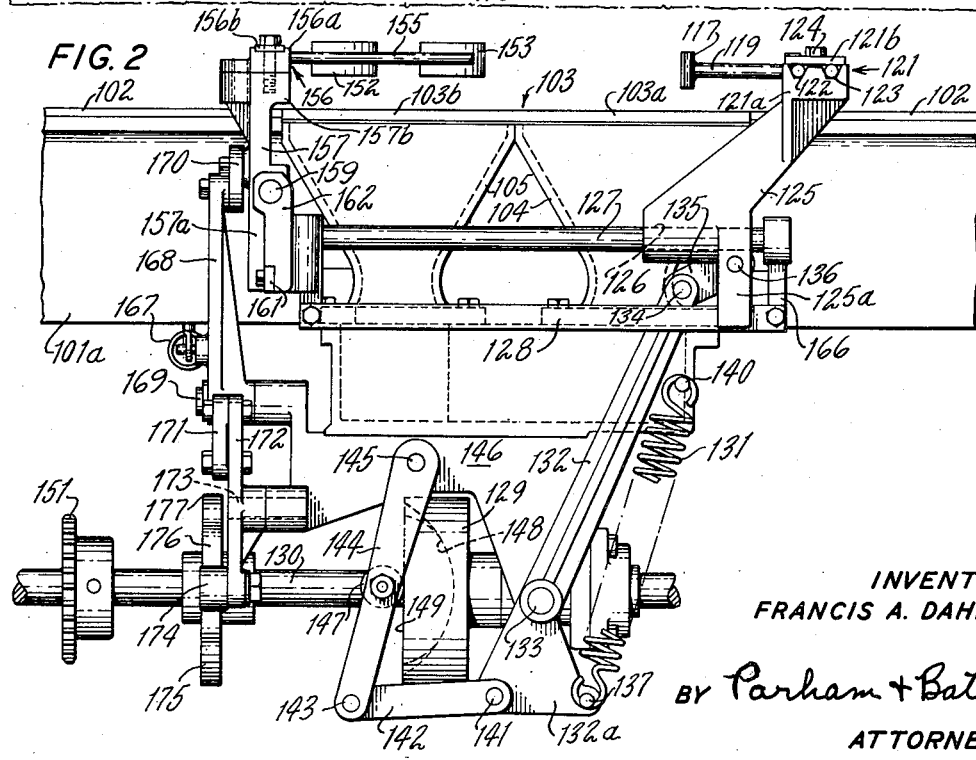
INVENTOR
FRANCIS A. DAHMS
BY Parham + Bates
ATTORNEYS

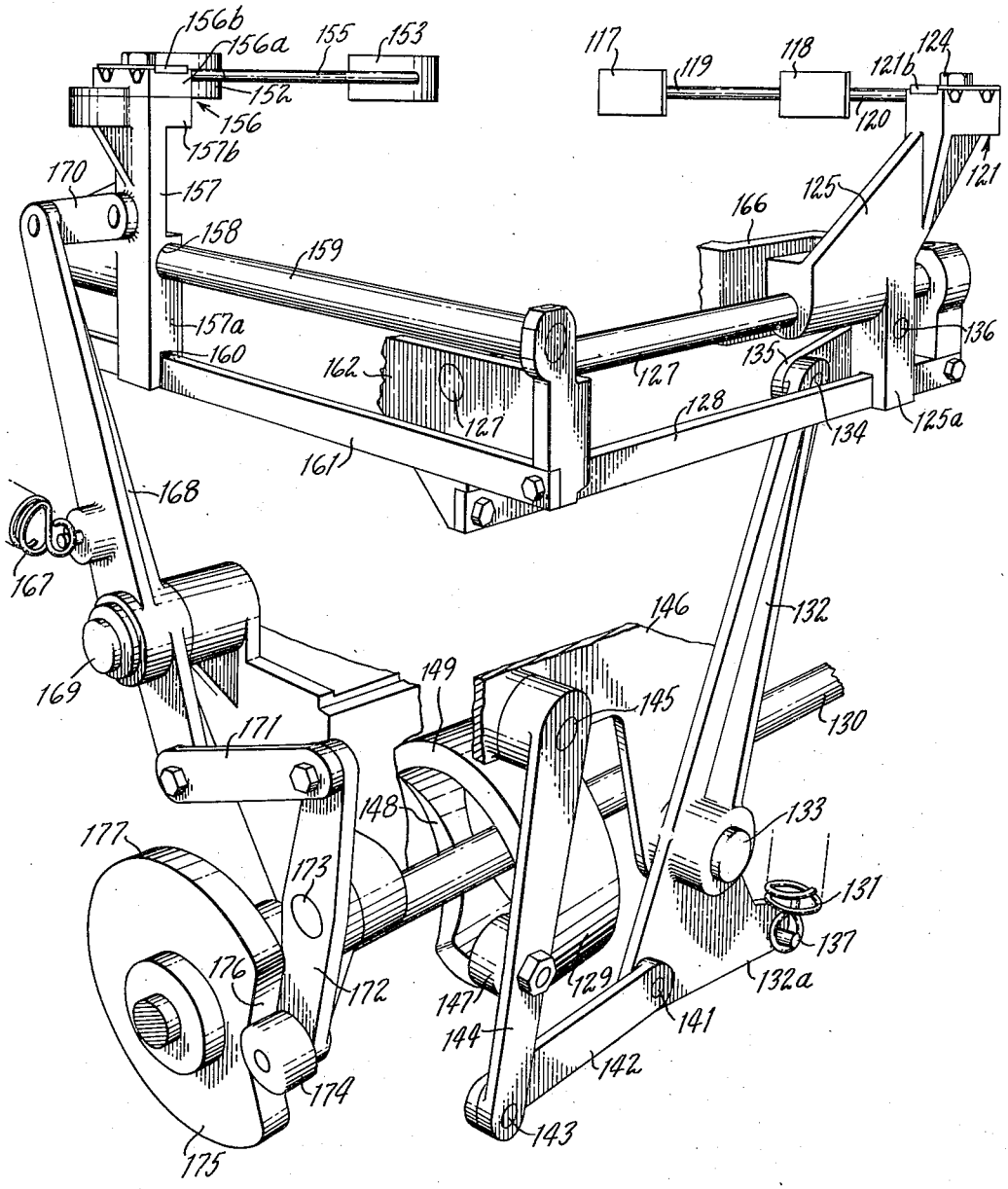

June 12, 1951  F. A. DAHMS  2,556,469
APPARATUS FOR DELIVERING NEWLY MOLDED GLASSWARE
Filed March 19, 1948  3 Sheets-Sheet 3
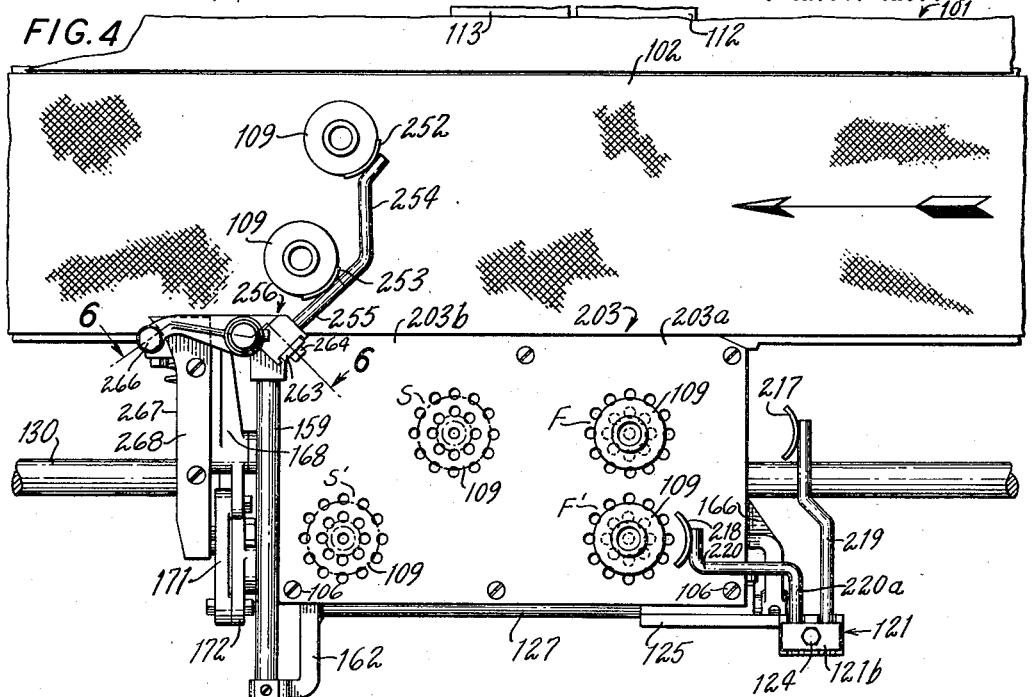
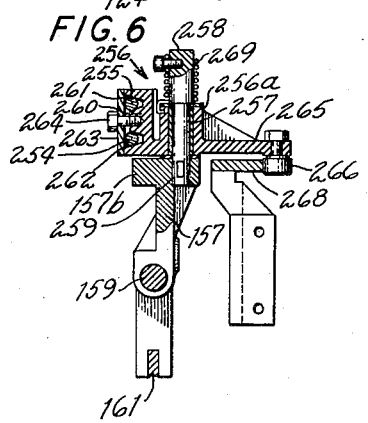
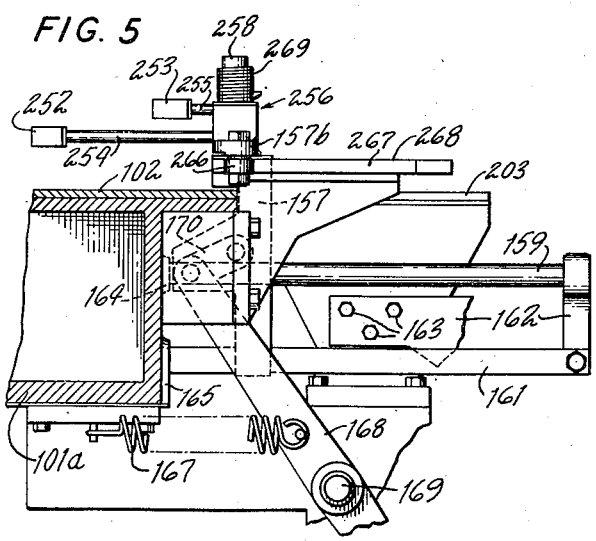
INVENTOR
FRANCIS A. DAHMS
BY Parham & Bates
ATTORNEYS Patented June 12, 1951

2,556,469

UNITED STATES PATENT OFFICE 2,556,469

APPARATUS FOR DELIVERING NEWLY MOLDED GLASSWARE

Francis A. Dahms, Manchester, Conn., assignor to Emhart Manufacturing Company, a corporation of Delaware Application March 19, 1948, Serial No. 15,774

10 Claims. (Cl. 49—47)

This invention relates generally to the manufacture of glassware and more particularly to the handling and treatment of newly formed glassware as it comes from the molds of a forming machine and is in the course of delivery to a conveyor for taking it to a heat treating apparatus, such, for example, as a lehr.

In the manufacture of glassware, such as bottles, the ware is formed of plastic glass having a high temperature. In the final mold of the forming machine, the hot glass is expanded to the shape of the mold wall and enough heat is extracted from the glass by the mold so that the formed article is at least temporarily form retaining, as for the period of time required for the taking of this article from the mold and depositing it on an adjacent support. The ware also may be internally cooled during part of the mold contact time to aid in setting up the article. However, present day demands in the manufacture of glassware require or make desirable removal of articles from the final molds of the forming machine at the ends of mold contact periods too short for extraction of enough heat from the molded glass to assure that a molded article will retain its shape if the heat remaining in the wall thereof has an opportunity to distribute itself so as to soften the temporarily stiffer outer surface layer of glass of the article wall. It is customary in the operation of one type of commercial glassware forming machine, known as the Hartford I. S. Machine, with which the present invention is particularly well adapted for use although not limited thereto, to take the formed articles of glassware out of a forming mold by a take-out means which lowers each formed article onto a perforated dead plate adjacent the mold so as to set the article down in an upward blast of cooling air supplied through the perforations of the dead plate. The operation of delivering a newly formed article of glassware onto such a dead plate, cooling it thereon, and then transferring it to an adjacent conveyor for transportation to a lehr, and the structure involved in these operations, are disclosed in Patent No. 1,921,390 of August 8, 1933, to Ingle.

An application of Ralph N. Worrest, Serial No. 758,054, filed June 30, 1947, owned by the owner of the present application, discloses an improvement over the disclosure of the above Ingle patent by providing conditions and a mode of operation such that the required cooling of each newly made article produced by a mold of the forming machine and delivered to an associate dead plate may be effected at two different dead plate stations at which the article may be presented successively. The Worrest application also discloses provisions for positioning each newly molded article of glassware at two different stations successively and removal of the glassware from the second station to an adjacent conveyor, whereby a wide variety of specifically different treatments of the glassware may be effected in the interval between the removal of the glassware from the forming mold and its delivery to the conveyor; thus, according to the proposal of the Worrest application, the glassware may be cooled by forced cooling at the first dead plate station and its treatment at the second station may include or consist of a different treatment thereof, such as fire finishing, internal cooling, tempering, inspection for "spikes" or other defects.

The present invention provides an improvement over the disclosure of the Worrest application by providing for simultaneous cooling of each of successive pairs of concurrently made, newly molded glass articles at a pair of dead plate stations to which the articles of each such pair have been delivered from an associate forming machine, and further cooling and/or other treatment of the same pair of concurrently produced articles at different dead plate stations to which such articles have been moved from the first stations and from which such articles may be transferred simultaneously to appropriate positions on an associate conveyor.

A further feature of improvement of the present invention is the provision of an apparatus for and mode of treatment of newly made articles of glassware such that the same apparatus may be used selectively for required cooling of pairs of concurrently produced or singly produced glass articles in two successive stages at different dead plate stations and for delivery of successive pairs of or single cooled articles to appropriate positions on an associate conveyor when the conveyor movement to carry the articles to a lehr is in one of two opposite directions and by the exchange of but a few readily removable and replaceable elements of that apparatus, it may be adapted for use similarly to cool pairs of concurrently produced articles and to transfer them when cooled to appropriate positions on an associate conveyor by which the articles are carried away in a direction opposite to that of the conveyor first mentioned.

The present invention also provides an apparatus for handling pairs of newly made glass articles so that such articles are readily accessible when at cooling stations on the dead plate for any one of various useful treatments, such as fire finishing, inspection for "spikes" or other defects, etc., in addition to or in lieu of part of the cooling treatment which may be given them at such stations.

Other objects and advantages of the present invention will hereinafter be pointed out or will become apparent from the following description of a practical embodiment thereof, as shown in the accompanying drawings, in which:

Fig. 1 is a plan view of a cooling dead plate for plural stage cooling of pairs of glass articles and associate parts of apparatus involved, including a conveyor, the view also showing pushers for moving the articles of each such pair from first cooling stations on the dead plate to second cooling stations thereon and from the second cooling stations onto the associate conveyor when the latter is arranged to move in the direction indicated;

Fig. 2 is a side view of the apparatus shown in Fig. 1, showing particularly the article pushers and their operating mechanisms;

Fig. 3 is a relatively enlarged detached perspective of the pushers and their supporting, guiding and operating means;

Fig. 4 is a view like Fig. 1 but showing the apparatus of the invention as adapted by substitution of different elements for a few of the components thereof for use for the cooling and transfer to the associate conveyor of pairs of articles of glassware when the movement of the conveyor is in the direction opposite to that of the conveyor of the Fig. 1 form of structure;

Fig. 5 is a fragmentary view, partly in vertical section and partly in elevation, showing the mounting means of the pushers for moving a pair of articles from the dead plate onto the associate conveyor; and Fig. 6 is a fragmentary section substantially along the line 6—6 of Fig. 4, showing the means for effecting a turning movement of the article pushers during reciprocatory movements thereof between retracted and article delivery positions.

Apparatus of the invention may include or make use of a stationary frame structure, a fragmentary portion of which is indicated generally at 101 in Figs. 1 and 4. A portion of this frame structure, designated 101a in Figs. 2 and 5, supports a horizontally disposed, rectilinearly movable conveyor 102, Figs. 1, 2, 4 and 5. In the Fig. 1 arrangement, the conveyor 102 is moving to the right as viewed in plan, as indicated by the direction arrow, while in Fig. 4, the direction of the conveyor is to the left as similarly viewed, as also indicated by a direction arrow. The conveyor may be constructed and operated as disclosed in the aforesaid Ingle Patent 1,921,390 or any other suitable known conveyor may be employed.

At the side of the conveyor 102 which appears to be lower-most in Fig. 1 is a horizontally disposed dead plate 103, the upper surface of which is at approximately the same level as the upper surface of the conveyor 102 as appears from Fig. 2. The dead plate 103 may be considered as functionally divided transversely thereof into two approximately half portions or sections, the right-hand one of which, designated 103a, overlies the top of a cooling air duct 104 while the left-hand approximately half portion or section thereof, designated 103b, similarly overlies the top of a cooling air duct 105. See Fig. 2. The dead plate may be removably fastened in place on the ducts, as by screws 106, Fig. 1.

The portion 103a of the dead plate is formed to provide two transversely aligned, spaced cooling stations, designated F and F', respectively, at which there are groups of cooling air holes 107 and 108, respectively, in the dead plate, these air holes overlying the duct 104 so as to direct jets of cooling fluid from the duct upwardly against the bottom and along the sides of articles of glassware, such as the bottles 109, standing on the dead plate at the dead plate stations. The ducts 104 and 105 may be supplied with cooling air under pressure through suitable supply passages, indicated at 110 and 111, respectively, these passages being controlled by individual dampers 112 and 113, respectively. The second approximately half portion of the dead plate is provided with cooling stations, designated S and S', respectively, at which the dead plate is provided with groups of air holes 114 and 115, respectively, through which air from the duct 105 may be discharged against the bottom and upwardly along the sides of glass articles at the stations S and S'. In Fig. 1, the parts of the apparatus are shown in relative positions and at a time in a cycle of operations of the apparatus such that no bottles then are at stations S and S', but the bottles 109 at the first cooling stations F and F' later will be moved to stations S and S', respectively, where they will occupy the positions there indicated by the showing in phantom lines.

The bottles 109 have been placed on the dead plate at the stations F and F' by conventional transfer means, as by a suitable take-out mechanism represented by the diagrammatic dot-and-dash line showing indicated at 116 in Fig. 1. Such take-out mechanism may be that of the aforesaid Hartford I. S. Machine.

Mechanism for moving the bottles 109 from the first cooling stations F and F' to the second cooling stations S and S', respectively, may comprise a pair of article-contact elements or pushers 117 and 118, respectively, carried by the ends of pusher arms 119 and 120, respectively. These pusher arms may be in the form of rods of suitable length and shape, the rod 120 being relatively short while the rod 119 is much longer and has a right-angular bend intermediate its length, as indicated at 119a. The ends of these rods remote from the pushers are removably clamped in place in a holder 121 comprising a body member 121a having rod receiving transverse notches 122 and 123, respectively, in its top, and a clamping cap plate 121b secured in place on the body member in clamping relation to the rods, as by a cap bolt 124. The arrangement is such that when the ends of the rods 119 and 120 remote from the pushers 117 and 118 are secured in the holder 121 as described, the rods are positioned over the plane of the dead plate, the pusher 117 is positioned for movement along a horizontal path from a retracted position as shown in Fig. 1 across the station F toward the station S, and the pusher 118 is similarly positioned with relation to the stations F' and S' except that the retracted position of the pusher 118 is relatively remote from the station F'.

The holder 121 is carried by a suitable carrier, in this instance, a travelling upright brancket-like member, designated 125, which is slideably mounted intermediately at 126 on a horizontally disposed rod 127 located below the level of the dead plate 103 at the side thereof remote from the conveyor 102. In the example shown, the body 121a of the holder 121 may be an integral upper portion of the carrier 125. This carrier has a depending lower end portion 125a slideably co-engaging a guide bar 128 which is located below and in parallel relation to the supporting rod 127. Movement of the carier 125 to effect working strokes of the pushers 117 and 118 may be produced by a cam 129 on a cam shaft 130, Figs. 2 and 3, acting through a suitable motion transmitting linkage against the action of a tension coil spring 131. As shown, a lever 132 is fulcrumed intermediately on a horizontal fulcrum pin 133 and has its upper end operatively connected at 134 to a link 135 which is operatively connected by a pivot pin 136 to the depending portion 125a of the carrier 125. The lever 132 has a flaring lower end portion 132a, one of the lower corner portions of which is operatively connected at 137 at one side of the vertical plane of the axis of the fulcrum pin 133 with the tension coil spring 131, the upper end of which is anchored, as at 140, Fig. 2, to a fixed support, which may be a portion of a wall of the cooling air passage structure. The opposite lower corner portion of the part 132a of the lever 132 is operatively connected at 141 with a link 142 which is operatively connected at 143 with the lower end of a cam roler lever 144, the upper end of which is pivoted at 145 on a horizontal fulcrum pin projecting from a stationary support, as from a bracket 146 from which the previously mentioned fulcrum pin 133 also may project. The level 144 carries a cam roller 147 held by the action of the spring 131 in rolling contact with the cam 129 at the edge of the latter which is remote from that spring. The contact edge of the cam 129 includes a concavely curved "low" portion 148, the remainder thereof, indicated at 149, lying in the same vertical plane and constituting a "dwell" portion. The cam saft 130 may be supported rotatably in any suitable known way, as by bearings such as that indicated at 150 in Fig. 1, and may be rotated by any suitable known means such, for example, as the cam shaft operating means of the aforesaid Hartford I. S. Machine as disclosed in the aforesaid Ingle Patent 1,921,390. A sprocket on the cam shaft, indicated at 151, Figs. 1 and 2, represents transmission means of such a cam shaft operating mechanism for rotating the cam shaft in the direction and at the speed required to coordinate the operations of the pusher mechanisms with those of associate mechanisms.

The bracket 146 may be joined, as by welding, to a convenient stationary structure, as to a wall of the adjacent cooling air supply passage or may be cast integrally therewith or fastened thereto in any other suitable known way.

It will be noted that the distance longitudinally of the dead plate 103 in Fig. 1 from the first cooling station F' to the corresponding second cooling station S' is substantially less than the distance from the first cooling station F to the corresponding second cooling station S, the second cooling station S being located out of transverse alignment with the station S' and nearer the adjacent edge of the dead plate 103. Articles moved transversely of the dead plate from the stations S and S' onto the conveyor 102 when it is moving in the direction indicated by the arrow in Fig. 1 therefore will not only be spaced transversely of the conveyor but longitudinally thereof. With the arrangement of pushers shown in Fig. 1, the pusher 118 will travel for a considerable distance on its working stroke before actually contacting the bottle at the station F' while the pusher 117 will contact its bottle at the station F near the beginning of its working stroke. Both bottles will be delivered to the stations S and S' at the ends of the working strokes of the pushers. The working strokes of these pushers are produced by a spring induced movement of the lever 132 when the cam roler 147 rides from the dwell portion 149 of the cam 129 down the concavely curved low portion 148 of the cam to the bottom thereof. The return or idle strokes of the pushers will be effected when the cam roller 147 rides up the second half of the low portion 148 of the cam back onto the dwell portion 149.

The mechanism for moving the bottles from the stations S and S' onto the conveyor 102 when the conveyor is moving in the direction indicated by the direction arrow of Fig. 1 comprises pushers 152 and 153 on end portions of pusher arms 154 and 155, respectively. These pusher arms are in the form of suitably bent rods of suitable length having their end portions remote from the pushers removably secured in a holder, generally designated 156. As shown in Figs. 1–3, the holder 156 includes a base or bed plate 156a and a cap or clamping plate 156b between which the pusher arms 154 and 155 are clamped by means of bolt 156c, which also serves to secure the holder members 156a and b to the upper end 157b of a traveling carrier 157. This travelling carrier 157 is slideably mounted at 158 on a horizontally disposed supporting rod 159 and has a depending lower end portion 157a slideably co-engaging, as at 160, with a horizontally disposed guide bar 161. The supporting rod 159 and the guide bar 161 may have their outer ends secured in or fastened to portions of a bracket 162 in a conventional manner. This bracket 162 may be fastened or joined to any suitable stationary structure as, for example, by cap screws 163 to the adjacent air passage wall structure as shown in Fig. 5 or it might be integral with such wall structure. The supporting rod 159 and the guide bar 161 are located at the end of the dead plate supporting structure at the end thereof remote from the first cooling stations F and F'. The ends of this supporting rod and guide bar next to the conveyor may be supported on any convenient stationary structure, as at 164 and 165, respectively, on the conveyor supporting portion 101a of the main frame structure, as shown in Fig. 5. As best seen in Fig. 3, the bracket 162 also may serve to support the adjacent ends of the guide rod 127 and the guide bar 128 of the first mentioned pusher mechanism. The other, more remote ends of the rod 127 and bar 128 may be supported by another bracket, indicated at 166, which may be formed integral with or fastened in any conventional manner to adjacent stationary wall structure.

The travelling carrier 157 is moved along the rod 159 and bar 161 to produce working strokes of the pushers 152 and 153, i. e., to move articles 109 from the second cooling stations S and S' to the positions shown on the conveyor 102 in Fig. 1. These working strokes of the pushers 152 and 153 are along rectilinear paths extending horizontally in directions approximately at right angles with the direction of movement of the conveyor 102. Such working strokes are produced by the action of a tension coil spring 167 which actuates a lever 168, fulcrumed intermediately on a projecting horizontal fulcrum pin 169 and having its upper end operatively connected by a link 170 to the travelling carrier 157 and its lower end operatively connected by a link 171 to a cam roller lever 172 which is intermediately fulcrumed on a projecting horizontal fulcrum pin 173 and carries a cam roller 174 at its lower end in rolling contact with the edge of a cam 175 on the cam shaft 130. The cam 175 has a "low" portion 176 and a "dwell" concentric portion 177 along which the cam roller rolls. Movement of the carrier 157 to the position shown in Fig. 1 for working strokes of the pushers 152 and 153 occurs when the cam roller 174 rides down the first half of the cam low edge portion 176. The return or idle strokes of the pushers 152 and 153 to position them for the next working strokes is effected when the cam roller 174 rides up the second half of the low portion 176 of the cam 175.

The sequence of working strokes of the two sets of pushers is appropriate for the operations required. Thus, bottles which have been cooled at the stations F and F' are moved by the pushers 117 and 118 to the stations S and S' when the pushers 152 and 153 are dwelling in their retracted positions. The pushers 117 and 118 then will be retracted quickly to permit further newly made articles of glassware to be deposited at the first cooling stations F and F'.

The same mechanism may be used without any change for cooling of singly produced articles of glassware. In such an operation, each single newly made article of glassware, on being taken out of its mold, may be placed at either station F or F' and in due course moved to station S or station S', according to the initial positioning thereof. One of the first pushers and the corresponding second pusher are of course idle throughout such operation and may be removed temporarily and replaced when cooling of pairs of articles is to be resumed.

When the conveyor 102 moves in the opposite direction from that shown in Fig. 1 or, otherwise described, in the direction indicated by the direction arrow in Fig. 4, the apparatus of the present invention, as described so far, may be adapted for use by removal of a few parts and substitution therefor of others, an operation which can be quickly and easily effected. Thus, the dead plate 103 of the apparatus as shown in Fig. 1 is replaced by a dead plate 203, Fig. 4, having cooling stations F and F' located on its right-hand approximately half portion 203a and cooling stations S and S' located on its left-hand approximately half portion 203b. The relative positions of the two first cooling stations F and F' are the same as in the first dead plate but the relative positions of the two cooling stations S and S' are different in that station S is now nearer the transverse median line of the dead plate and to its corresponding cooling station F while the station S' is near the adjacent end edge of the dead plate and at a relatively increased distance from its corresponding cooling station F'. The pusher 117 and its pusher arm 119 are replaced by a pusher 217 and a pusher arm 219 of a different length and different longitudinal configuration. The pusher 118 and its pusher arm 120 likewise are replaced by a pusher 218 and a pusher arm 220, the latter having a right-angularly bent portion 220a intermediately similar to the pusher arm 119 of the first described pusher mechanism. By this arrangement, the pusher 218 is relatively close to its station F' while the pusher 217 is a substantial distance from its station F' when the pushers are in their retracted positions, as shown in Fig. 4.

The pushers 152 and 153 and their arms 154 and 155, respectively, also are replaced by pushers 252 and 253 and pusher arms 254 and 255, respectively, together with the holder 156 which is removed from the head, indicated at 157b, Figs. 3, 5 and 6 of the carrier 157. This leaves the head 157b of the carrier 157 available for a holder 256 which, as best seen in Fig. 6, has a vertically apertured mounting portion 256a by which the holder 256 is rotatably mounted at 257 on a pivot pin 258 which projects upwardly from a vertically apertured portion 259 of the head of the carrier 157. The holder 256 has a laterally facing clamp body portion 260 provided with longitudinally extending grooves 261 and 262, respectively, and a clamping cap plate 263 is fastened to this clamp body, as by a cap screw 264, to clamp the pusher arms 255 and 254, respectively, in place in the holder. A lateral projection 265 on the opposite side of the mounting portion 256a from the clamp body 260 carries a cam roller 266 riding along a cam edge 267 of a stationary cam bar 268. A torsion spring 269 exerts pressure continuously on the mounting portion 256a of the pusher holder 256 so as to tend to rotate such holder in a clockwise direction as viewed in Fig. 4 and to hold the cam roller against the cam 267 during all movements of the carrier 157 along its support. The cam edge 267 is laid out so that the pushers 252 and 253 will be swung angularly about the axis of the vertical pivot pin 258 during the reciprocatory movements of these same pushers as the carrier 157 is moved back and forth in the manner and by the means hereinbefore described. This is for the purpose of appropriately positioning the articles 109 on the conveyor 102 when the direction of the latter is as indicated at Fig. 4 and the articles are moved in unison from the second cooling stations to such conveyor.

It is apparent that the mechanism as just described as suitable for use when the conveyor is moving in the direction shown in Fig. 4 may be readily restored to its original condition for use when the direction of movement of the conveyor is as shown in Fig. 1. In either example, the articles at the dead plate stations, particularly when at the second cooling stations, are accessible for useful treatments in lieu of or in addition to cooling, as, for example, for fire finishing or inspection or testing for "spikes" or other defects.

The details of the illustrative apparatus herein shown and described may be modified or altered in ways which will now readily suggest themselves to those skilled in the art, and I, therefore, do not wish to be limited to such details.

I claim:

1. In apparatus for handling glassware, a longitudinally movable horizontal conveyor for glassware, and glass article cooling means located at one side of said conveyor and adjacent thereto for receiving successive pairs of concurrently made still relatively hot articles of glassware from an associate forming machine, said cooling means having successive stations at which to cool each such pair of articles received by stages respectively performed at said successive cooling stations to set up the walls of such articles to shape-retaining condition, and means for transferring each pair of articles when cooled at their respective first stations to their respective succeeding stations for further cooling and from the latest of said cooling stations onto said conveyor so as to place them thereon concurrently in predetermined relative positions suitable for transportation by the conveyor to an associate instrumentality for dealing further with said articles.

2. In glassware handling apparatus, a conveyor for glassware, and a dead plate adjacent to said conveyor and formed and arranged to provide a plurality of stations thereon, each adapted to accommodate a newly formed glass article to be delivered thereto from an associate machine for forming such articles a like number of additional stations each adapted to accommodate such a glass article and located to permit transfer thereto of such article from one of said first named stations and transfer of the article therefrom onto said conveyor, and transfer means to transfer said articles from said first named stations to the second named stations and from said second named stations onto said conveyor.

3. In glassware handling apparatus, a conveyor for glassware, a dead plate adjacent to said conveyor and formed and arranged to provide a plurality of stations thereon, each adapted to accommodate a newly formed glass article to be delivered thereto from an associate machine for forming such articles, and a like number of additional stations, each adapted to accommodate such a glass article and located to permit transfer thereto of such article from one of said first named stations and transfer of the article therefrom onto said conveyor, transfer means to transfer said articles from said first named stations to the second named stations and from said second named stations onto said conveyor, and means to direct cooling air against the bottoms and upwardly against the lateral surfaces of the articles at said stations.

4. Apparatus as defined by claim 2 wherein said conveyor and said dead plate have substantially horizontal upper surfaces located at approximately the same level and sufficiently proximate to each other to permit said articles to be slid from said second named stations across portions of said dead plate onto said conveyor, and wherein said transfer means comprises pusher means to contact said articles at said first named stations and to slide them on said dead plate to said second named stations and other pusher means to contact said articles at said second named stations and to slide them therefrom across said portions of the dead plate onto said conveyor.

5. Apparatus as defined by claim 4 wherein said first and said second named pusher means are operated in predetermined time relation to each other.

6. Apparatus as defined by claim 2 wherein said dead plate has groups of holes formed therein underneath the articles at the several stations and, in combination therewith, means to discharge independently regulable volumes of cooling air upwardly through said holes at said first named and said second named stations, respectively.

7. Glassware handling apparatus comprising a horizontal conveyor for glassware, a horizontal dead plate at one side of the conveyor in ware transferring relation thereto, said dead plate being perforated to provide a plurality of transversely aligned article cooling stations in an approximately transversely half portion of the dead plate and a like number of diagonally aligned cooling stations in the remaining approximately half portion of the dead plate, individual article pushers for said first named stations, each mounted to move horizontally over the dead plate to push an article from its particular station to one of said second named stations, other pushers individual to said second named stations, each mounted to move horizontally over the dead plate to push an article from its station to a predetermined delivery position on the conveyor, operating means to move said first named and said second named pushers in predetermined timed sequence, and means to supply cooling air upwardly through said perforated dead plate against the bottoms and upwardly against the sides of the articles at at least some of said stations.

8. Apparatus as defined by claim 7 wherein said operating means comprises spring means connected to move the pushers on their working strokes and cam-actuated means connected to the pushers to control the spring actuated strokes of the pushers and to effect return strokes thereof.

9. Apparatus as defined by claim 7 wherein said operating means comprises a horizontally reciprocable carrier adjacent to the dead plate, a holder carried thereby, pusher arms held by said holder and supporting said first named pushers, a second horizontally reciprocating carrier adjacent to said dead plate, a holder carried thereby, pusher arms held by said second named holder carrying said second named pushers, and means to reciprocate said carriers in timed relation to each other.

10. Apparatus as defined by claim 9 wherein said second named holder is mounted on its carrier to travel therewith and also to turn about a vertical axis in relation thereto and, in combination therewith, cam means to turn said holder and the parts carried thereby about said vertical axis during the horizontal reciprocatory movements of the holder with its carrier.

FRANCIS A. DAHMS.

REFERENCES CITED

The following references are of record in the file of this patent:

UNITED STATES PATENTS

| Number | Name | Date |
|---|---|---|
| 1,921,390 | Ingle | Aug. 8, 1933 |
| 1,974,837 | Shillinger et al. | Sept. 25, 1934 |
| 2,180,737 | Hess | Nov. 21, 1939 |
| 2,182,167 | Berthold | Dec. 5, 1939 |
| 2,282,848 | Berthold | May 12, 1942 |
| 2,284,796 | Berthold | June 2, 1942 |
| 2,340,729 | Barker, Jr. | Feb. 1, 1944 |
| 2,413,722 | Long | Jan. 7, 1947 |